Oct. 31, 1933.  W. DÄLLENBACH  1,933,097
VACUUM DISCHARGE APPARATUS
Filed July 15, 1932   2 Sheets-Sheet 1
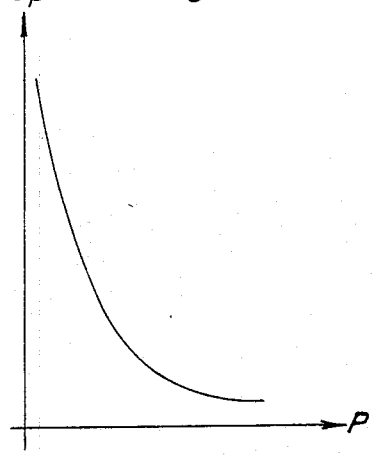
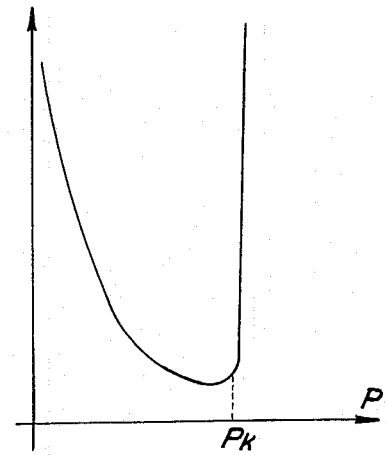
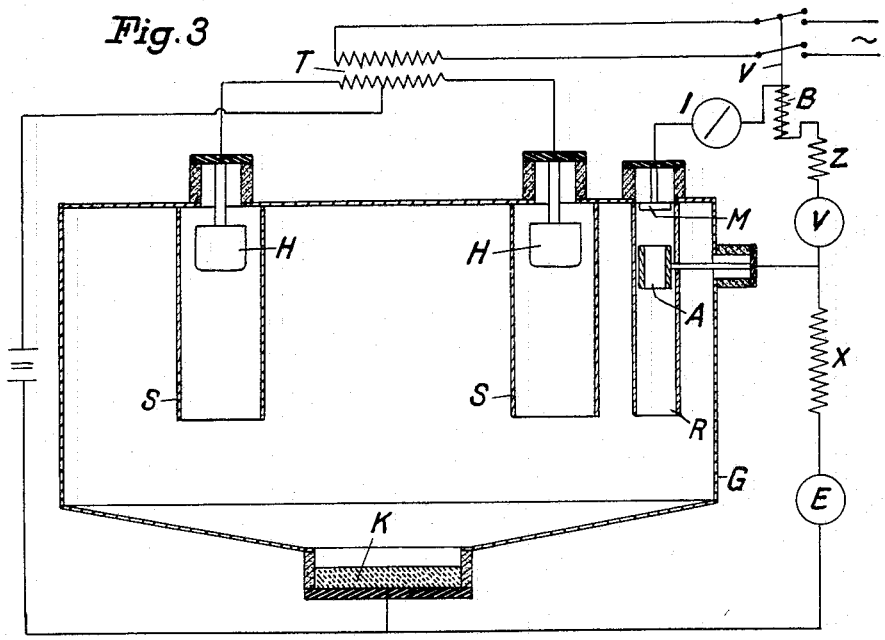
Inventor:
Walter Dällenbach Oct. 31, 1933.   W. DÄLLENBACH   1,933,097
VACUUM DISCHARGE APPARATUS
Filed July 15, 1932    2 Sheets-Sheet 2

Inventor:
Walter Dällenbach

Patented Oct. 31, 1933

1,933,097

UNITED STATES PATENT OFFICE 1,933,097

VACUUM DISCHARGE APPARATUS

Walter Dällenbach, Berlin, Germany

Application July 15, 1932, Serial No. 622,701, and in Germany July 20, 1931

19 Claims. (Cl. 175—363)

My invention relates to improvements in arrangements for controlling the vacuum i. e., for indicating and supervising the vacuum in vacuum discharge apparatus having incandescent cathodes or mercury cathodes and filled with a rarefied gaseous medium (gas or vapour) for example mercury vapour rectifiers with or without control electrodes.

In particular my invention relates to control arrangements which operate by means of an auxiliary anode in the vacuum discharge apparatus and an auxiliary discharge between this auxiliary anode and the cathode.

One feature of my invention is constituted by a metering electrode which is arranged outside the core of the auxiliary discharge. A quantity of particles participating in the discharge and dependent on the vacuum which is being regulated diffuses to this metering electrode from the core of the discharge and the control current flowing through the metering electrode to the indicating or supervising device is affected in accordance with the alterations in the vacuum which is to be controlled.

The diffusion of charged particles from the core of the discharge is greatest at high vacuum and is smaller than the lower vacuum i. e., it varies with the gas or vapour pressure within the vacuum vessel. If now the metering electrode is sufficiently negatively charged a current flows through it which is determined by the number of positive ions diffusing to the electrode. If the metering electrode is positively charged, the current flowing through the metering electrode is determined by the electron diffusion.

In the accompanying drawings Fig. 1 shows the relationship between the current $I_P$ and the gas or vapour pressure P when the metering electrode is negatively charged and Fig. 2 shows the relationship between the current $I_E$ flowing through the metering electrode and the gas or vapour pressure P when the metering electrode is positively charged.

If the circumstances are otherwise the same the current $I_E$ is appreciably greater than the current of positive ions and as seen from Fig. 2 varies initially in a similar way with increasing gas or vapour pressure to the current $I_P$ as shown in Fig. 1. At a definite gas or vapour pressure $P_K$ impact ionization occurs at the metering electrode. Consequently the space charge layer of electrons at the surface of the metering electrode is destroyed and a so-called intermediate cathode is formed in front of the metering electrode and the current flowing through the metering electrode shows a rapid increase.

As follows from the foregoing explanation the quantity of charged particles diffusing to the metering electrode does in fact form a measure of the degree of vacuum in the vacuum discharge apparatus.

Such an arrangement according to my invention is characterized by being used for making it possible to obtain a direct control of the vacuum. In addition it exhibits the advantage that the calibration curve is completely constant even over long periods.

As in vacuum discharge apparatus it is usually important to control the vacuum in the vicinity of the anode, it is a further feature of my invention to arrange the auxiliary anode and the metering electrode spacially in a position relatively to the main anodes in which the vacuum affecting the control arrangement is approximately equal to the vacuum in the anode space.

A further feature of my invention is to provide means which render the response of the indicating or control arrangement independent of the load on the vacuum discharge apparatus.

Experiments have shown that a so-called intermediate cathode forms at the surface or in the vicinity of the auxiliary anode. This intermediate cathode does not always assume the same position relatively to the auxiliary anode but often wanders in an irregular manner. Consequently disturbing displacements of the metering characteristics of the arrangement can occur which would detrimentally affect the constancy and reliability of the measurements. Therefore it is a further feature of my invention to dispose in the path of discharge between the auxiliary anode and the cathode in the vicinity of the auxiliary anode a screen limiting the cross section of the arc. In this way the intermediate cathode is kept remote from the surface of the auxiliary anode and is arrested in the form of a so-called striction cathode at the reduced cross section of the screen. By this measure the disturbances which are otherwise observed can be completely avoided.

If the gas or vapour pressure increases very considerably then it may occur that the free path of the electrons is so small that apart from the intermediate cathode at the reduced cross section of the screen a further intermediate cathode forms at the surface of the auxiliary anode or in the space between auxiliary anode and screen, which can also give rise to disturbances. In order to avoid this it is only necessary to position the screen and the intermediate cathode forming in its reduced cross section sufficiently close to the auxiliary anode. One then obtains an arrangement in which no intermediate cathode occurs at the auxiliary anode throughout the entire range of pressure which comes into question.

Further features and advantages of my invention are set out in the claims which constitute a part of my invention.

Two embodiments of my invention are shown in the accompanying drawings in which:

Fig. 3 shows an arrangement without a screen and

Figure 4:
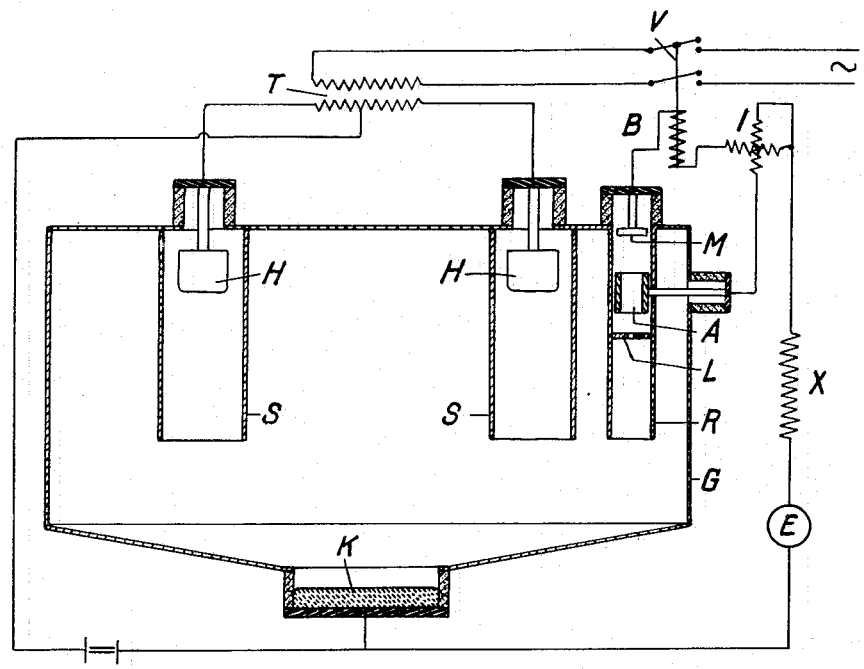
Fig. 4 shows a similar arrangement with screen in front of the auxiliary anode.

G is the vacuum vessel of the rectifier, K the cathode and H the main anodes which are surrounded in the usual manner by protective sleeves S. The auxiliary anode A consists of a tubular section and is accommodated within a protecting tube R so that the anode A is protected against ions from the main arc. In order to reduce lead-in connections, electrodes and energy losses, the auxiliary anode A can be used as the exciter anode of the rectifier. The mouth of the protecting tube R is in the vicinity of the mouth of one of the anode sleeves S so that the gas or vapour pressure within the tube R is approximately the same as the gas or vapour pressure in the vicinity of the anodes. Above the auxiliary anode A which has an aperture extending through it in its longitudinal direction, is disposed a metering electrode M so that it is disposed outside the core of the auxiliary discharge which extends from the anode A in a downward direction along the axis of the tube R and then from the mouth of the tube to the cathode K. Now electrons and positive ions from the sheath surrounding A can diffuse through A to the metering electrode M. At low gas or vapour pressure this diffusion proceeds readily. The higher the gas or vapour pressure the more the diffusing charged particles are obstructed and the smaller will be the diffusion current which can flow through the metering electrode M.

The auxiliary discharge is maintained by a voltage E which may be a D. C. or an A. C. voltage. In order to make the current density of the auxiliary discharge independent of the load on the rectifier it is advisable to dispose in the feed circuit to the auxiliary discharge an adequately large impedance X and to ensure that the feed voltage E is also independent of the load on the rectifier.

A voltage V is applied to the metering electrode M this voltage being preferably measured relatively to the auxiliary anode A. In the case of a rectifier with a metallic vacuum vessel this voltage however can be applied relatively to the vessel in that with constant auxiliary discharge the vacuum vessel and the auxiliary anode A are at an approximately constant voltage difference. The voltage V applied to the metering electrode M may be a D. C. or an A. C. voltage in the same way as the voltage E and all combinations are possible relatively to the voltage E. If both voltages are alternating then there may be any desired phase difference between them. According as to whether an electron current or a positive ion current is to flow to the metering electrode M the voltage V is chosen to be in the same phase or in the opposite phase to the auxiliary discharge. In order that the induction of the metering or controlling arrangement may be independent of the load on the rectifier the voltage V also is preferably made independent of the load on the rectifier.

In series with the metering electrode M is a metering instrument I which serves for showing the state of the vacuum. In addition the control coil B of an electro-magnetic switch arrangement V is connected in series with the metering electrode M and can serve for throwing the pump system into and out of operation in dependence upon the vacuum which is to be controlled or for opening and closing the switch for the current feeding the rectifier. The dimensioning of the control coil B can be such that the switch V disposed in the circuit supplying current to the transformer T does not remain closed provided that the current passing through the metering electrode lies beneath a certain minimum value. Instead of such a circuit arrangement it is however also possible to use known circuit arrangements which prevent the vacuum discharge apparatus being used or throw the pump system into and out of operation in accordance as to whether the current through the metering electrode is less or greater than a predetermined minimum value. To prevent the currents passing through the metering electrode from building up to values which exceed the permissible value, an impedance Z is provided.

Further according to the invention the metering electrode M may have positive potentials applied to it constantly or intermittently, these potentials being so chosen that with a gas or vapour pressure $P_K$ which constitutes the boundary to pressures which are too high to be permissible, impact ionization occurs in front of the metering electrode M. Then on attaining the pressure $P_K$ the current passing through the metering electrode M increases rapidly. This current increase can be used for example by way of the control coil B for occasioning suitable known precautions such as for example opening the supply circuit, controlling the pumps and the like.

The positive voltages which in this case are applied to the metering electrode M relatively to its surroundings are greater than the ionization potential of the gas or vapour in the vicinity of the metering electrode M and for the rest are best determined by experiments in accordance with the value of $P_K$ at which the rapid current increase is desired. The fact that the rapid increase in the current passing through the metering electrode M occasioned by the ionization occurs at a definite gas or vapour pressure $P_K$ is associated with the fact that with increasing gas pressure the number of electrons diffusing to the metering electrode M decreases which results in an increase in the thickness of the electronic space charge layer disposed in front of the metering electrode M. If, however, the thickness of the space charge layer increases then on attaining a certain thickness of the layer an ionization destroying the negative space charge will occur in a manner similar to that at sparking voltage.

In the embodiment shown in Fig. 4 an arrangement is shown having a screen in front of the auxiliary electrode and the same reference letters are utilized to indicate equivalent parts. Inserted in the protecting tube R in the vicinity of the auxiliary anode is a screen L which restricts the cross section of the arc. In the aperture of this screen is formed an intermediate cathode which is spacially held by the screen and is in the form of a so-called striction cathode. In consequence of this feature constant conditions obtain at the surface of the auxiliary anode so as to permit of measurements being reproduced. The screen L may be constructed in the form of an apertured plate or may consist of a tubular section.

It has moreover been found that the particles diffusing from the auxiliary anode A or diffusing to the metering electrode M give rise to a current passing through M even if no voltage is applied by A and M but if these two electrodes are short circuited. This current still flows through the metering electrode if a metering instrument I or a relay coil B for controlling switches for example is inserted in the circuit between A and M provided that such apparatus does not offer too great a resistance to the current passing through the metering electrode M. Voltage drops in such apparatus amounting to 1 volt and below are without practical significance for the current passing through the screen L and consequently are directly permissible.

As the current to the auxiliary anode A is always subjected to certain fluctuations and as the current to the metering electrode M varies proportionally to the anode current with constant vacuum, it is advantageous to utilize the relationship of the currents passing to the metering electrode M and the auxiliary anode A for indicating and/or controlling the state of the vacuum instead of utilizing the current passing to the metering electrode M. This can be effected that in the metering circuit between M and A instruments such as cross coil instrument I as shown in Fig. 4, are inserted which instruments are affected by the relationship between the metering electrode current and the auxiliary anode current.

What I claim is:

1. An arrangement for controlling the vacuum in vacuum discharge apparatus, comprising a vacuum vessel filled with a rarefied gaseous medium, anodes and a cathode in said vacuum vessel, means for maintaining a discharge between said anodes and said cathode, in combination with an auxiliary anode, means for maintaining an auxiliary discharge between the auxiliary anode and the cathode, a metering electrode disposed outside the core of the auxiliary discharge, said metering electrode being adapted to receive a quantity of charged particles diffusing from the core of the discharge in dependence upon the vacuum to be controlled and a control device which responds in dependence upon the current flowing through said metering electrode.

2. An arrangement as claimed in claim 1, comprising an auxiliary anode and a metering electrode arranged in spacial relationship to the main anodes in a position in which the vacuum affecting the control device is approximately equal to the vacuum in the vicinity of the main anodes.

3. In an arrangement for controlling the vacuum of vacuum discharge apparatus consisting of a vacuum vessel filled with a rarefied gaseous medium, anodes and a cathode in said vacuum vessel and means for maintaining a discharge between the anodes and the cathode, in combination with an auxiliary anode, a voltage source of any suitable kind (A. C. or D. C.) connected to the auxiliary anode for maintaining an auxiliary discharge between the auxiliary anode and the cathode, and a metering electrode disposed outside the core of the auxiliary discharge, said metering electrode being adapted to receive a quantity of charged particles diffusing from the core of the discharge in dependence upon the vacuum to be controlled, a control device responding in dependence upon the current flowing through the metering electrode and means adapted to render the response of the control device independent of the load on the vacuum discharge apparatus.

4. An arrangement according to claim 1, comprising means screening the auxiliary anode and the metering electrode against the action of the main discharge of the vacuum discharge apparatus.

5. In an arrangement for controlling the vacuum of vacuum discharge apparatus consisting of a vacuum vessel filled with a rarefied gaseous medium, anodes and a cathode in said vessel and means for maintaining a discharge between the anodes and the cathode, in combination with an auxiliary anode, means for maintaining an auxiliary discharge between the auxiliary anode and the cathode, means adapted to render the current strength of the auxiliary discharge independent of the load on the vacuum discharge apparatus and a metering electrode disposed outside the core of the auxiliary discharge, said metering electrode being adapted to receive a quantity of charged particles diffusing from the core of the discharge in dependence upon the vacuum to be controlled and a control device which responds in dependence upon the current flowing through the metering electrode.

6. An arrangement as claimed in claim 1, comprising in the metering current circuit of the auxiliary discharge an impedance of sufficient magnitude for the purpose of rendering the current strength of the auxiliary discharge independent of the load on the vacuum discharge apparatus.

7. In an arrangement for controlling the vacuum of vacuum discharge apparatus consisting of a vacuum vessel filled with a rarefied medium, anodes and a cathode in said vessel and means for maintaining a discharge between the anodes and the cathode, in combination with an auxiliary anode, a voltage source of any desired kind (A. C. or D. C.) connected to the auxiliary anode for maintaining an auxiliary discharge between the auxiliary anode and the cathode, means adapted to render the voltage feeding the auxiliary discharge independent of the load on the apparatus and a metering electrode disposed outside the core of the auxiliary discharge, said metering electrode being adapted to receive a quantity of charged particles diffusing from the core of the discharge in dependence upon the vacuum to be controlled and a control device which responds in dependence upon the current flowing through the metering electrode.

8. An arrangement as claimed in claim 1, comprising a source of current associated with the metering electrode and applying thereto a voltage relatively to the ionized gaseous atmosphere.

9. An arrangement as claimed in claim 1, comprising in combination with a source of current associated with the metering electrode and applying thereto a voltage relatively to the ionized gaseous atmosphere and means adapted to render this voltage independent of the load on the apparatus.

10. An arrangement for controlling the vacuum of vacuum discharge apparatus consisting of a vacuum vessel filled with rarefied gaseous medium, an anode and a mercury cathode in said vacuum vessel and means for maintaining a discharge between the anode and the mercury cathode, in combination with an auxiliary anode adapted at the same time to constitute the exciter anode, means for maintaining a discharge between the auxiliary anode and the cathode and a metering electrode arranged outside the core of the auxiliary discharge and adapted to receive a quantity of charged particles diffusing from the core of the discharge in dependence upon the vacuum to be controlled and a control device which responds in dependence upon the current flowing through the metering electrode.

11. In an arrangement for controlling the vacuum of vacuum discharge apparatus consisting of a vacuum vessel filled with rarefied gaseous medium, anodes and a cathode in said vacuum vessel and means for maintaining a discharge between the anodes and the cathode, in combination with an auxiliary anode, means for maintaining an auxiliary discharge between the auxiliary anode and the cathode, a screen restricting the cross section of the arc in the path of the discharge between the auxiliary anode and the cathode in the vicinity of the auxiliary anode for the purpose of preventing the formation of an intermediate cathode at the auxiliary anode and a metering electrode arranged outside the core of the auxiliary discharge and adapted to receive a quantity of charged particles diffusing from the core of the discharge in dependence on the vacuum to be controlled and a control arrangement which responds in dependence upon the current flowing through the metering electrode.

12. In an arrangement for controlling the vacuum of vacuum discharge apparatus consisting of a vacuum vessel filled with rarefied gaseous medium, anodes and a cathode in said vacuum vessel and means for maintaining a discharge between said anodes and said cathode, in combination with an auxiliary anode, means for maintaining an auxiliary discharge between the auxiliary anode and the cathode, a screen disposed in the path of the discharge between auxiliary anode and cathode in the vicinity of the auxiliary anode to restrict the cross section of the arc and a metering electrode disposed outside the core of the auxiliary discharge and adapted to receive a quantity of charged particles diffusing from the core of the discharge in dependence upon the vacuum to be controlled and a control arrangement which responds in dependence upon the current flowing through the metering electrode.

13. In an arrangement for controlling the vacuum of vacuum discharge apparatus consisting of a vacuum vessel filled with rarefied gaseous medium, anodes and a cathode in this vacuum vessel and means for maintaining the discharge between the anodes and the cathode, in combination with an auxiliary anode, means adapted to maintain the auxiliary discharge between the auxiliary anode and the cathode, a metering electrode arranged outside the core of the auxiliary discharge and adapted to receive a quantity of charged particles diffusing from the core of the discharge in dependence upon the vacuum to be controlled and a metering instrument adapted to indicate the state of the vacuum and connected in series with the metering electrode.

14. In an arrangement for controlling the vacuum of vacuum discharge apparatus consisting of a vacuum vessel filled with a rarefied gaseous medium, anodes and a cathode in said vacuum vessel and means for maintaining a discharge between the anodes and the cathode, in combination with an auxiliary anode, means for maintaining an auxiliary discharge between the auxiliary anode and the cathode, a metering electrode arranged outside the core of the auxiliary discharge and adapted to receive a quantity of charged particles diffusing from the core of the discharge in dependence upon the vacuum to be controlled and an electromagnetic switch device adapted when actuated to switch off the vacuum discharge apparatus, the control coil of said electromagnetic switch device being connected in series with the metering electrode.

15. In an arrangement for controlling the vacuum of vacuum discharge apparatus consisting of a vacuum vessel filled with a rarefied gaseous medium, anodes and a cathode in said vacuum vessel and means for maintaining a discharge between the anodes and the cathode, in combination with an auxiliary anode, means for maintaining an auxiliary discharge between the auxiliary anode and the cathode, a metering electrode arranged outside the core of the auxiliary discharge and adapted to receive a quantity of charged particles diffusing from the core of the discharge in dependence upon the vacuum to be controlled and inserted in the metering circuit between metering electrode and auxiliary anode, a control device for the vacuum which is controlled in dependence upon the relationship between the metering electrode current and the auxiliary anode current.

16. In an arrangement for controlling the vacuum of vacuum discharge apparatus consisting of a vacuum vessel filled with a rarefied gaseous medium, anodes and a cathode in said vacuum vessel and means for maintaining a discharge between the anodes and the cathode, in combination with an auxiliary anode, means for maintaining an auxiliary discharge between the auxiliary anode and the cathode, a metering electrode arranged outside the core of the auxiliary discharge and adapted to receive a quantity of charged particles diffusing from the core of the discharge in dependence upon the vacuum to be controlled and a switch device which responds in dependence upon the current flowing through the metering electrode to control the current feeding the vacuum discharge apparatus, said switch arrangement being adapted to prevent the operation of the vacuum discharge apparatus when the current through the metering electrode is less than a predetermined minimum value.

17. An arrangement as claimed in claim 1, including a conducting-connection between the metering electrode and the auxiliary anode, the controlling means being inserted into said connection.

18. An arrangement as claimed in claim 1, having applied to the metering electrode a positive voltage adapted on the gaseous medium attaining a predetermined high pressure to occasion impact ionization at the surface of the metering electrode and the formation of an intermediate cathode.

19. An arrangement as claimed in claim 1, having a positive voltage applied to the metering electrode and adapted on the gaseous medium attaining a predetermined high pressure to occasion impact ionization at the surface of the metering electrode and the formation of an intermediate cathode and a switch device for throwing the vacuum discharge apparatus into and out of operation and responding in dependence upon the increase of current resulting from the occurrence of the impact ionization.

WALTER DÄLLENBACH.